Patented Feb. 13, 1951

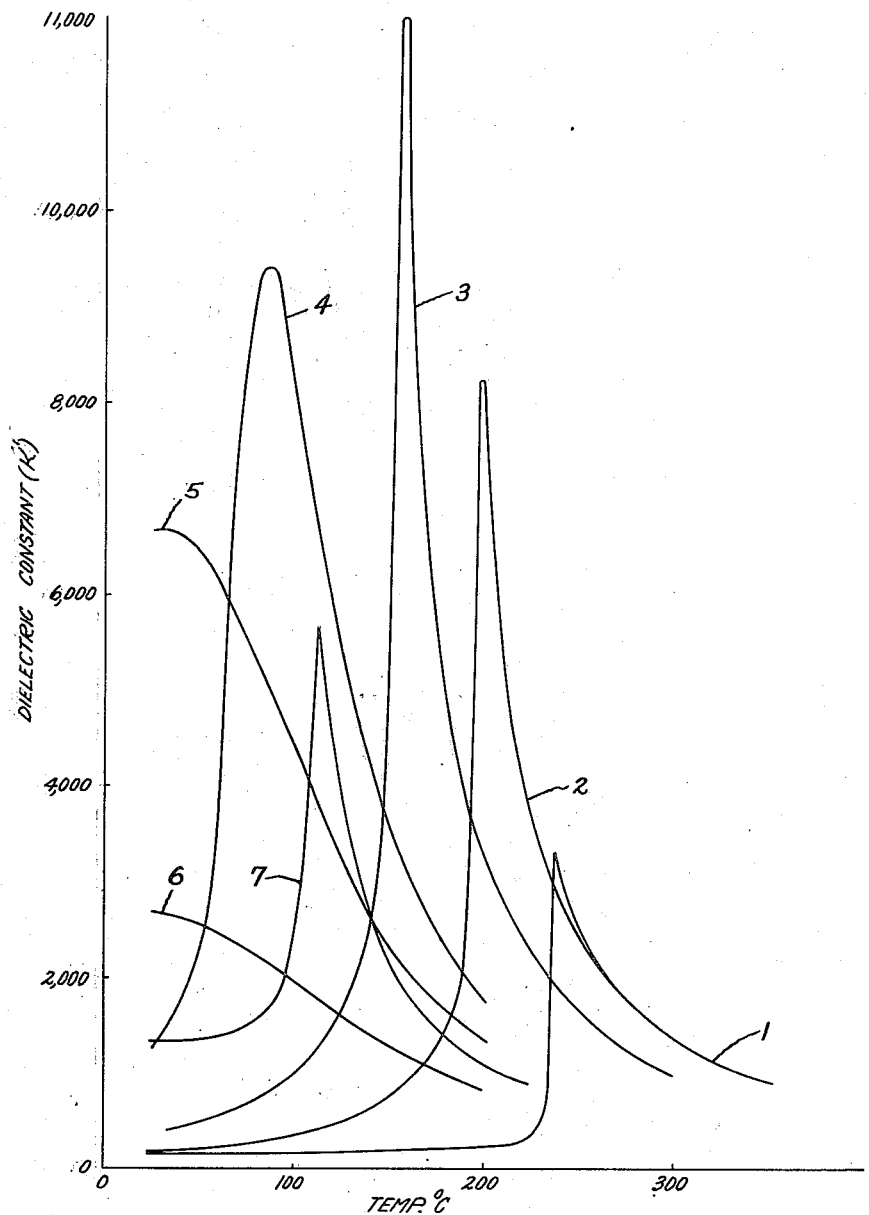

2,541,833

UNITED STATES PATENT OFFICE 2,541,833

CERAMIC DIELECTRICS AND METHOD OF MAKING

Shepard Roberts, Scotia, N. Y., assignor to General Electric Company, a corporation of New York Application January 12, 1949, Serial No. 70,536

9 Claims. (Cl. 106—39)

This invention relates to dielectric materials and methods of making them. More particularly, it relates to dielectric materials of ceramic nature.

It is known that certain ceramic materials exhibit a very high dielectric constant at certain temperatures. Barium titanate is an example of such a ceramic dielectric. It has now been discovered that lead zirconate has a superior dielectric constant at certain temperatures. Lead zirconate has a dielectric constant measured at one megacycle of only about 120 at room temperature which gradually increases to about 250 at 200° C. However, when the temperature is further increased, there is an extremely rapid rise in the value of the dielectric constant until a maximum value of about 4000 is reached at about 235° C. As the temperature is further increased, the dielectric constant value slopes off more gradually to a value of about 1000 at around 350° C.

The high dielectric constant of lead zirconate indicates its use in electrical applications where a high dielectric constant is desirable. Such uses are in miniature capacitor elements for printed circuits and in midget high voltage electrical capacitors as well as non-linear capacitors. The very high dielectric constant would also point to use in electromechanical and electroacoustical devices where piezoelectric phenomena are employed. However, the occurrence of the desirably high dielectric constant of lead zirconate at temperatures in excess of those encountered in ordinary applications limits its uses. In addition, while the dielectric constant of lead zirconate is high, for some applications, as in capacitors, it is desirable to have even a higher dielectric constant than lead zirconate alone affords.

It is an object of this invention to provide dielectric materials and a method of manufacture thereof containing lead zirconate which possess high dielectric constants at temperatures below those possible with lead zirconate alone.

It is also an object of this invention to improve the dielectric constant of lead zirconate.

It is a further object of the present invention to provide dielectric materials and a method of manufacture thereof which contain lead zirconate and which possess continuously high dielectric constants at temperatures encountered in electrical apparatus.

Other objects will become apparent from a consideration of the following description and the drawing in which the single figure shows the variation in dielectric constant of various materials with temperature.

It has been found that dielectric materials having a desirably high dielectric constant at relatively low temperatures may be prepared by modifying lead zirconate with other material.

It has further been found that dielectric materials having a desirably high dielectric constant at temperatures encountered in electrical apparatus may be prepared by adding varying amounts of an alkaline earth metal zirconate to lead zirconate.

It has also been found that dielectric materials of improved dielectric constant may be provided by a solid solution comprising lead zirconate and an alkaline earth metal zirconate.

More particularly, it has been found that such improved dielectric materials may be prepared by modifying lead zirconate with up to about 40 mol percent of barium zirconate.

While the dielectric material of this invention may be compounded by carefully mixing together the desired proportions of barium zirconate and lead zirconate, it has been found that a more intimate mixing of the two substances may be attained by forming the mixture in situ by chemical reaction. Lead oxide, zirconium oxide and barium carbonate of the highest purity, mixed in stoichiometric proportions according to the end product desired, are first stirred with water in a high speed stirrer for about an hour. The intimately mixed raw materials are then filtered to remove water, dried, broken up and passed through a fine mesh screen, a fifty-mesh screen being suitable. The resulting powder is calcined in a covered platinum crucible at a temperature of 1000° C. to 1050° C. The resulting cake is then pulverized and passed through a 325-mesh sieve. This powder is moistened with water and compressed into discs of desired size with about 5000 pounds per square inch pressure. For test purposes, discs one-eight inch in thickness and one-half inch in diameter were found suitable. The discs are placed in a furnace which is then heated to a temperature ranging from about 1300° C. to 1400° C. A firing time of one-half hour was found sufficient in most cases to bring the entire charge up to temperature. A longer firing period, however, does not detract from the quality of the end product.

Inasmuch as lead oxide is very volatile at temperatures within the sintering or firing range, precautions should be taken to prevent its escape from the reaction mixture with resultant unbalancing of the proportions of the reaction mixture and the production of soft and porous fired discs having poor electric properties. The loss of lead oxide during firing may be obviated in any of a number of manners. A preferred procedure is to place the compressed but unfired disc in a covered platinum crucible which is placed inside a larger covered platinum crucible containing lead oxide. At the firing temperature, the lead oxide generates a partial vapor pressure within the crucible which prevents escape of lead oxide from the reacting mixture. A very small amount of lead oxide may be present in the final product. Hard, dense, mechanically strong discs are obtained using this process. This is in contradistinction to firing without the aid of the partial pressure of lead oxide wherein only soft porous discs having poor electrical properties were produced even when using a fluxing agent.

Reference to the drawing will at once make apparent favorable characteristics of the materials of this invention. The dielectric constant and loss factor of barium titanate and pure lead zirconate at one megacycle are shown for comparative purposes. It will be observed that by a judicious variation of the ratio of barium zirconate and lead zirconate in the discs, dielectric materials having a wide range of regular dielectric constant values may be attained. This is in contradistinction to barium titanate whose point of highest dielectric constant is very narrow with respect to temperature changes. A number of lead zirconate-barium zirconate compositions having very high dielectric constants are also shown. In the drawing, the curves correspond to the following materials and mixtures:

Curve 1: 100% lead zirconate
Curve 2:
    90 mol percent lead zirconate
    10 mol percent barium zirconate
Curve 3:
    80 mol percent lead zirconate
    20 mol percent barium zirconate
Curve 4:
    70 mol percent lead zirconate
    30 mol percent barium zirconate
Curve 5:
    65 mol percent lead zirconate
    35 mol percent barium zirconate
Curve 6:
    60 mol percent lead zirconate
    40 mol percent barium zirconate
Curve 7:
    100% barium titanate While it is possible to compound ceramic dielectric compositions of the type described herein containing more than 40 mol percent barium zirconate, the dielectric constant is unduly lowered and an advantage of the invention lost.

All dielectric constants ($K'$) were measured at one megacycle. The data presented graphically in the drawing is presented below in tabular form, the dielectric loss factor $\tan \delta$, also being given.

| Pure lead zirconate | | | 90% lead zirconate, 10% barium zirconate | | |
|---|---|---|---|---|---|
| Temp., °C | $K'$ | $\tan \delta$ | Temp., °C | $K'$ | $\tan \delta$ |
| 23 | 110 | .0028 | 25 | 143 | .0084 |
| 50 | 114 | .0028 | 50 | 180 | .0093 |
| 100 | 133 | .0027 | 75 | 212 | .0100 |
| 150 | 162 | .0035 | 100 | 346 | .0240 |
| 200 | 218 | .0042 | 125 | 466 | .0329 |
| 225 | 329 | .0054 | 150 | 670 | .0369 |
| 230 | 453 | .0071 | 175 | 1,188 | .0414 |
| 232 | 517 | .0081 | 190 | 2,510 | .0424 |
| 234 | 1,189 | .0070 | 192 | 3,530 | .0406 |
| 236 | 3,260 | .0040 | 194 | 8,000 | .0191 |
| 238 | 3,020 | .0020 | 195 | 8,150 | .0102 |
| 240 | 2,880 | .0022 | 196 | 8,000 | .0100 |
| 250 | 2,350 | .0017 | 200 | 6,900 | .0062 |
| 275 | 1,632 | .0021 | 225 | 3,450 | .0035 |
| 300 | 1,260 | .0030 | 250 | 2,280 | .0035 |
| 350 | 865 | .0072 | 275 | 1,650 | .0046 |
|  |  |  | 300 | 1,286 | .0060 |

| 80% lead zirconate, 20% barium zirconate | | | 70% lead zirconate, 30% barium zirconate | | |
|---|---|---|---|---|---|
| Temp., °C | $K'$ | $\tan \delta$ | Temp., °C | $K'$ | $\tan \delta$ |
| 33 | 370 | .0238 | 25 | 1,227 | .0257 |
| 50 | 453 | .0285 | 41 | 1,690 | .0245 |
| 75 | 633 | .0317 | 50 | 2,240 | .0245 |
| 100 | 957 | .0311 | 60 | 4,270 | .0280 |
| 125 | 1,580 | .0350 | 64 | 6,320 | .0294 |
| 140 | 2,600 | .0455 | 66 | 7,320 | .0254 |
| 148 | 5,600 | .0503 | 70 | 8,340 | .0158 |
| 150 | 9,850 | .0347 | 75 | 8,980 | .0180 |
| 152 | 11,000 | .0250 | 80 | 9,330 | .0187 |
| 154 | 10,500 | .0174 | 85 | 9,330 | .0157 |
| 160 | 8,470 | .0105 | 90 | 8,820 | .0148 |
| 175 | 5,180 | .0053 | 100 | 7,800 | .0107 |
| 200 | 3,180 | .0035 | 125 | 5,110 | .0064 |
| 250 | 1,563 | .0020 | 150 | 3,430 | .0043 |
| 300 | 950 | .0038 | 175 | 2,380 | .0026 |
|  |  |  | 200 | 1,750 | .0021 |

| 65% lead zirconate, 35% barium zirconate | | | 60% lead zirconate, 40% barium zirconate | | |
|---|---|---|---|---|---|
| Temp., °C | $K'$ | $\tan \delta$ | Temp., °C | $K'$ | $\tan \delta$ |
| 25 | 6,630 | .0329 | 24 | 2,600 | .0081 |
| 40 | 6,530 | .0147 | 50 | 2,490 | .0070 |
| 50 | 6,350 | .0100 | 75 | 2,245 | .0077 |
| 60 | 6,000 | .0074 | 100 | 1,920 | .0086 |
| 75 | 5,400 | .0055 | 150 | 1,255 | .0041 |
| 100 | 4,250 | .0047 | 200 | 820 | .0013 |
| 125 | 3,140 | .0035 |  |  |  |
| 150 | 2,290 | .0024 |  |  |  |
| 175 | 1,705 | .0017 |  |  |  |
| 200 | 1,310 | .0014 |  |  |  |

| 100% barium titanate | | |
|---|---|---|
| Temp., °C | $K'$ | $\tan \delta$ |
| 24 | 1,310 | .0042 |
| 50 | 1,310 | .0078 |
| 75 | 1,466 | .0095 |
| 90 | 1,770 | .0117 |
| 100 | 2,535 | .0152 |
| 104 | 4,060 | .0155 |
| 106 | 5,090 | .0140 |
| 108 | 5,650 | .0129 |
| 110 | 5,650 | .0104 |
| 112 | 5,410 | .0099 |
| 115 | 4,970 | .0068 |
| 120 | 4,250 | .0064 |
| 125 | 3,690 | .0056 |
| 150 | 2,090 | .0033 |
| 175 | 1,423 | .0021 |
| 200 | 1,060 | .0022 |
| 225 | 845 | .0021 |
| 250 | 705 | .0031 |

From the above, it will be seen that lead zirconate-barium zirconate dielectrics having a wide range of dielectric constants as well as high dielectric constants which may be used at ordinary electrical apparatus temperatures may be fabricated by following the teachings of this invention.

It will further be seen by comparing the values for the above zirconate dielectrics with those for barium titanate that a substantial improvement is obtained over the latter material both as to the attainment of higher dielectric constants as well as constancy of favorably high dielectric constants at low temperatures. While in the specific examples given barium zirconate has been given as the modifying material, it is only typical of any of the alkaline earth metals calcium, barium and strontium, any of which may be used.

It is to be understood that while the ceramic dielectric materials of this invention are described herein as being formed in the shape of discs, the material may be fabricated in sheets, rods or any form desired. Electrical contact may likewise be made to the material by conventional means. One procedure is to coat those parts of the material on which contact is to be made with a silver paint which is then fired to provide a silver electrode.

The compositions of this invention may be permanently polarized by momentarily applying a strong electric field. The polarized ceramic then exhibits a piezoelectric effect and may be used for any application requiring a piezoelectric medium.

The piezoelectric properties of these materials are illustrated by the following experiment: A 0.0978 inch thick disc of the ceramic material containing 20 mol percent barium zirconate and 80 mol percent lead zirconate was heated and maintained at 160° C., for one hour while a direct current potential difference of 1250 volts was maintained between the silvered electrode surfaces on opposite faces of the disc. The disc was then cooled to 75° C., and the voltage removed. When cool, the disc was tested in a device which applied compressive forces normal to the silvered surfaces. The charge developed in this manner corresponded to a sensitivity of about $34 \times 10^{-12}$ coulomb per newton of applied force. The sensitivity to hydrostatic pressure was likewise determined in an oil-filled variable-pressure chamber and was found to be about $16 \times 10^{-12}$ coulomb per newton. These values give a sensitivity of $$\frac{(34-16)(10^{-12})}{2}$$

or $9 \times 10^{-12}$ coulomb per newton for compressive forces in the lateral direction or on the unsilvered sides. These values are comparable in magnitude to those of piezoelectric crystals of types used at present in phonograph pickups, microphones and other types of transducers. Similar results are obtained when the potential difference is impressed on the disc at room temperature.

The nonlinear dielectric properties of these lead zirconate-barium zirconate dielectrics were demonstrated by the following experiment: The impedance of a disc of material consisting of 35 mol percent barium zirconate and 65 mol percent lead zirconate was measured in a bridge circuit at a frequency of 0.65 megacycle while at the same time a variable D.-C. voltage was superimposed on the measuring circuit. The values obtained for D.-C. field strength (kv./mm.), dielectric constant, (K') and dielectric loss (tan δ) are shown below:

| kv./mm. | K' | Tan δ |
|---|---|---|
| 0 | 6,730 | 0.0207 |
| 0.215 | 6,450 | 0.0187 |
| 0.43 | 5,920 | 0.0172 |
| 0.86 | 4,390 | 0.0140 |
| 1.29 | 3,380 | 0.0122 |
| 1.72 | 2,690 | 0.0112 |
| 2.15 | 2,280 | 0.0114 |
| 2.58 | 1,905 | 0.0103 |
| 3.02 | 1,640 | 0.0096 |
| 3.45 | 1,470 | 0.0093 |
| 3.88 | 1,325 | 0.0089 |
| 4.31 | 1,180 | 0.0090 |

The results tabulated above indicate a wide range in capacitance values obtained in a given capacitor which may be controlled by a superimposed variable D.-C. voltage. Capacitors of this type are useful as phase, amplitude and frequency modulators, frequency converters, amplifiers, harmonic generators and in other applications.

What I claim as new and desire to secure by Letters Patent of the United States is:

1. A ceramic dielectric material consisting of from about ten mol percent to forty mol percent alkaline earth zirconate and from about ninety mol percent to sixty mol percent of lead zirconate.

2. A ceramic dielectric material consisting of about twenty mol percent alkaline earth zirconate and eighty mol percent lead zirconate.

3. A ceramic dielectric material consisting of about thirty-five mol percent alkaline earth zirconate and sixty-five mol percent lead zirconate.

4. An electrical capacitor comprising cooperating spaced armatures and a dielectric medium therebetween comprising a solid solution of lead zirconate and alkaline earth zirconate consisting of ten to forty mol percent alkaline earth zirconate and ninety to sixty mol percent lead zirconate.

5. A nonlinear electrical capacitor comprising cooperating spaced armatures and a dielectric medium therebetween comprising a solid solution of ninety to sixty mol percent lead zirconate and ten to forty mol percent alkaline earth zirconate.

6. In the manufacture of a dielectric material, the process of reducing finely divided lead zirconate and alkaline earth zirconate to an intimately mixed powder consisting of ten to forty mol percent alkaline earth zirconate and ninety to sixty mol percent lead zirconate, calcining the mixed powder, pulverizing the calcined material, compressing into a coherent mass and firing at from about 1300° C. to 1400° C.

7. In the manufacture of a dielectric material, the process of intimately mixing lead oxide, zirconium oxide and alkaline earth carbonate in proportions such that on firing there is obtained a product consisting of ten to forty mol percent alkaline earth zirconate and ninety to sixty mol percent lead zirconate, calcining the mixture, pulverizing the calcined material, compressing into desired form and firing at a temperature of from 1300° C. to 1400° C.

8. A ceramic dielectric material consisting of about ten mol percent to forty mol percent barium zirconate and from about ninety mol percent to sixty mol percent of lead zirconate.

9. An electrical capacitor consisting of cooperating spaced armatures and a dielectric medium therebetween comprising a solid solution of ninety to sixty mol per cent lead zirconate and ten to forty mol percent barium zirconate.

SHEPARD ROBERTS.

REFERENCES CITED

The following references are of record in the file of this patent:

UNITED STATES PATENTS

| Number | Name | Date |
|---|---|---|
| 2,424,111 | Navias et al. | July 15, 1947 |